United States Patent [19]
Leiber

[11] 3,948,568
[45] Apr. 6, 1976

[54] ARRANGEMENT FOR AUTO CHECKING A HYDRAULIC SYSTEM

[75] Inventor: Heinz Leiber, Leimen, Germany

[73] Assignee: Teldix GmbH, Heidelberg, Germany

[22] Filed: July 17, 1974

[21] Appl. No.: 489,439

[30] Foreign Application Priority Data
Aug. 22, 1973 Germany............................ 2342307

[52] U.S. Cl............. 303/21 AF; 188/181 R; 303/20; 303/21 F
[51] Int. Cl.²............................................ B60T 8/02
[58] Field of Search............ 303/21 F, 21 A, 21 AF, 303/21 B, 21 BB, 20; 188/181; 73/121, 39, 122, 128, 129, 488; 340/52 R, 52 B

[56] References Cited
UNITED STATES PATENTS

| | | | |
|---|---|---|---|
| 3,275,384 | 9/1966 | Hirzel | 73/121 |
| 3,549,211 | 12/1970 | Leiber | 303/21 F |
| 3,645,584 | 2/1972 | Leiber et al. | 303/21 F |
| 3,680,923 | 8/1972 | Peterson et al. | 303/21 AF |
| 3,702,206 | 11/1972 | Sweet | 303/21 AF X |
| 3,759,582 | 9/1973 | Ohta et al. | 303/21 AF |
| 3,767,272 | 10/1973 | Leiber | 303/21 AF |
| 3,866,980 | 2/1975 | Eisele | 303/21 AF |

*Primary Examiner*—Trygve M. Blix
*Assistant Examiner*—Douglas C. Butler
*Attorney, Agent, or Firm*—Spencer & Kaye

[57] ABSTRACT

An autochecking arrangement for a hydraulic system, which includes an actuating piston displaceable under the action of a pressure source and controllable as to displacement independently of the pressure of the pressure source by a valve arrangement, comprises a pressure sensor connected into the hydraulic system and emitting signals corresponding to at least two sensed pressure thresholds, a switching system for providing sequentially different actuation states of the hydraulic system and a monitor for monitoring the correct actuation of the hydraulic system in cooperation with the signals from the pressure sensor.

17 Claims, 7 Drawing Figures

ARRANGEMENT FOR AUTO CHECKING A HYDRAULIC SYSTEM

BACKGROUND OF THE INVENTION

The invention relates to an arrangement for autochecking a hydraulic system, in which the pressure of a pressure source is used to displace an actuating piston and the position of the piston is variable by means of a control valve arrangement independently of the pressure of the pressure source. The invention is particularly suitable for checking brake circuits of a vehicle equipped with an antilock control system.

For example, in case of a vehicle braking system with an antilock controller in which the pressure at the wheel brakes is controlled in dependence on tendencies of the wheels to lock when braking, it is necessary to check rapidly from time to time the operability of the parts of the hydraulic circuit, i.e., the effectiveness of the pump, the sealing of the valves and their prompt response and so on. This checking may be desirable, for example, before the beginning of the journey. In the case of conventional checking methods, a roller test stand is necessary, with the assistance of which the effects of the actuation of the individual parts of the hydraulic circuit can be determined. Inferences can be made from the effects detected regarding the functioning of the various parts of the hydraulic circuit.

SUMMARY OF THE INVENTION

It is an object of the invention to provide an arrangement which initiates an autochecking of the functioning of a hydraulic system on the basis of an instruction provided and indicates any malfunction.

According to the invention, there is provided an autochecking arrangement for a hydraulic system including an actuating piston, a pressure source for supplying pressure for displacing said actuating piston and a valve arrangement for varying the position of said actuating piston independently of said pressure of said pressure source, said arrangement comprising pressure sensing means connected into said hydraulic system and emitting signals corresponding to at least two sensed pressure thresholds, switch means for controlling said hydraulic system to provide sequentially different actuation states of said hydraulic system, and monitoring means for monitoring said different actuation states of said hydraulic system in cooperation with said pressure sensing means and for producing an indication when the actuation state monitored is different from a desired actuation state.

BRIEF DESCRIPTION OF THE DRAWINGS

The invention will now be described in greater detail, by way of example, with reference to the drawings, in which.

DESCRIPTION OF THE PREFERRED EMBODIMENTS

Basically, the invention proposes, in a hydraulic system of the type mentioned at the beginning, that an autochecking arrangement be incorporated having pressure sensing means which emit signals corresponding to at least two sensed pressure thresholds, switch means for controlling the hydraulic system so as to provide sequentially different actuation states and monitoring means for monitoring these actuation states in cooperation with the pressure sensing means and providing an indication when these states differ from desired states.

A generator may be provided for controlling the switch means and warning means may be actuated by the indication produced by the monitoring means. Detecting means may be provided in the monitoring means for detecting with the aid of the signals at the thresholds if within given times given pressure changes are reached.

The pressure sensing means may comprise a conventional pressure switch with at least two stages. However, an apparatus can also be provided which continuously produces a pressure dependent signal and, for the production of switching signals, compares this pressure signal with threshold values. This apparatus can operate in an analog or a digital manner. If a substantial displacement of a piston is associated with the pressure variation, this piston displacement may be used to produce switching signals, for example, switches may be actuated by means of a plunger connected to the piston or the closeness of the plunger to a switch arrangement can be determined (for example, using a magnet secured to the plunger and a magnetic field sensitive element for detecting it). If the hydraulic system has a pump with associated storage chambers, or any other associated storage chambers with a spring biassed element and means for measuring the deflection of the element, the measurement of this deflection can be used to obtain a measurement of the pressure. If only a slight spring pressure acts on the movable element in the storage chamber, then only a low pressure variation occurs with a variation of the amount of fluid. However, this variation can be measured by measuring the volume variation in the storage chamber.

A few possible applications of the invention will now be described by way of example. However, the applications mentioned are not exhaustive. One possible application of the invention is in brake apparatus in which the necessary pressure is produced by a pump, which pressure is controlled, according to the brake actuation, by means of a valve arrangement at the brakes. In this case, the pressure sensor senses the pressure at the wheel brakes. With a twin circuit brake system, this requires two pressure sensors and with the additional use of control valves for antilock control, a number of pressure sensors corresponding to the number of control valves is required. However, a pressure sensor can be connected between pump and control valve arrangement, that is to say independently of whether antilock control valves are provided and the effect of the valve actuation on the pressure sensed by this pressure sensor can be measured. Here it is necessary to render the pump inoperative periodically since otherwise a pressure variation could not be obtained.

The invention can also be used with brake apparatus with antilock controllers in which a valve connected into the pressure line can be kept open by means of a plunger (so-called plunger applications) which plunger is connected to a displaceable piston. Here, with a tendency to lock, a displacement of the piston is caused by means of an electromagnetic valve and a pump in order to close the valve connected into the pressure line and to vary the brake fluid volume at the wheel brake. Here, the part of the apparatus controlling the piston position can be checked by the arrangement in accordance with the invention. In this case, it is useful to use the piston position as a measurement of the pressure.

The checking arrangement in accordance with the invention can also be used with normal brake apparatus with antilock controllers, that is to say brake apparatus with a brake master cylinder and an electromagnetic valve arrangement connected into the line between the brake master cylinder and the wheel brake cylinder. This electromagnetic valve arrangement blocks the individual brake lines from time to time and connects the line section lying between the electromagnetic valve arrangement and the wheel brake cylinder to a return line into which is connected a pump for the return feed of the fluid let out to the main pressure line. Here, in accordance with the invention, the pressure sensor in the return line can be connected before the pump and is preferably constructed as a storage chamber for the fluid which is let out, wherein the displacement of the movable part of the storage chamber which is under the slight spring pressure, is measured and evaluated. The volume of fluid entering the storage chamber is thus used here for the threshold determination. A prerequisite for this is that a predetermined pressure is produced by the brake master cylinder for checking, by actuating the brake master cylinder with a predetermined force. How the checking is effected will be described hereinafter.

It should be further mentioned that the initiation of the checking can be effected by the driver or by the person carrying out the inspection. Whether the testing device is carried in the vehicle and thus put into action by the driver from time to time or whether the check is carried out only in the case of the inspection, and thus is constructed as a piece of service apparatus which can be connected to the vehicle, is a question of price. Where the checking device is carried by the vehicle, preferably, means are provided for stopping the checking device when the vehicle operates, for example, if the motor is running.

Figure 1:
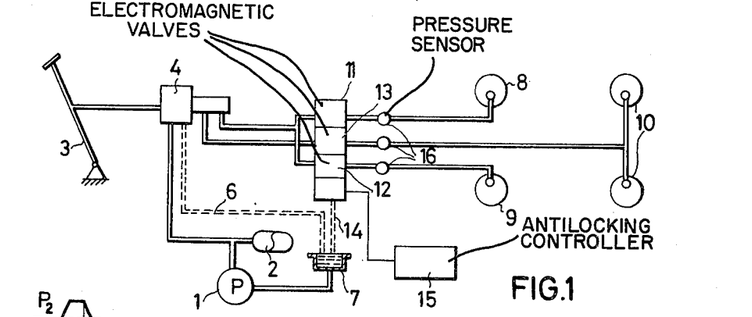
FIG. 1 shows in a main outline a brake system with an antilock controller, in which a plurality of pressure sensors are provided.

Referring now to the drawings, a known brake system equipped with an antilock controller is shown in FIG. 1. The brake system contains a pump 1, with a small store 2 connected thereto, and a brake control valve 4 actuated by the brake pedal 3 of the vehicle. When the valve 4 is not actuated, pressure medium pumped by the pump is returned by way of a line 6 (shown broken) to a fluid reservoir 7. On the other hand, when braking takes place, pressure is produced in two brake circuits connected to the valve 4 in dependence on the extent of the actuation of the brake pedal 3; the brakes of the two front wheels 8 and 9 of the vehicle are associated with one brake circuit and the two rear wheels 10 are associated with the other circuit. Electromagnetic valve arrangements 11 to 13 are connected into the lines leading to the wheel brakes of the wheels 8, 9 and 10. With these valve arrangements, it should be assumed that they normally (first position) permit an unhindered brake fluid feed to the wheel brakes, in a second position interrupt the feed of brake fluid and, in a third position, continue to interrupt the brake fluid feed to the wheels brakes and to reduce the brake pressure by allowing brake fluid to flow from the wheel brake cylinders into the reservoir by way of line 14. These valves 11, 12 and 13 are individually controlled by an electronic evaluation unit 15 of the antilock controller in accordance with the rotary behavior of the associated wheel 8 or 9 or the associated wheels 10. Pressure sensors 16, which produce a signal in the case of the pressure passing two specified different pressure thresholds, are connected into the lines to the wheel brakes for a purpose to be descirbed hereafter.

Figure 2:
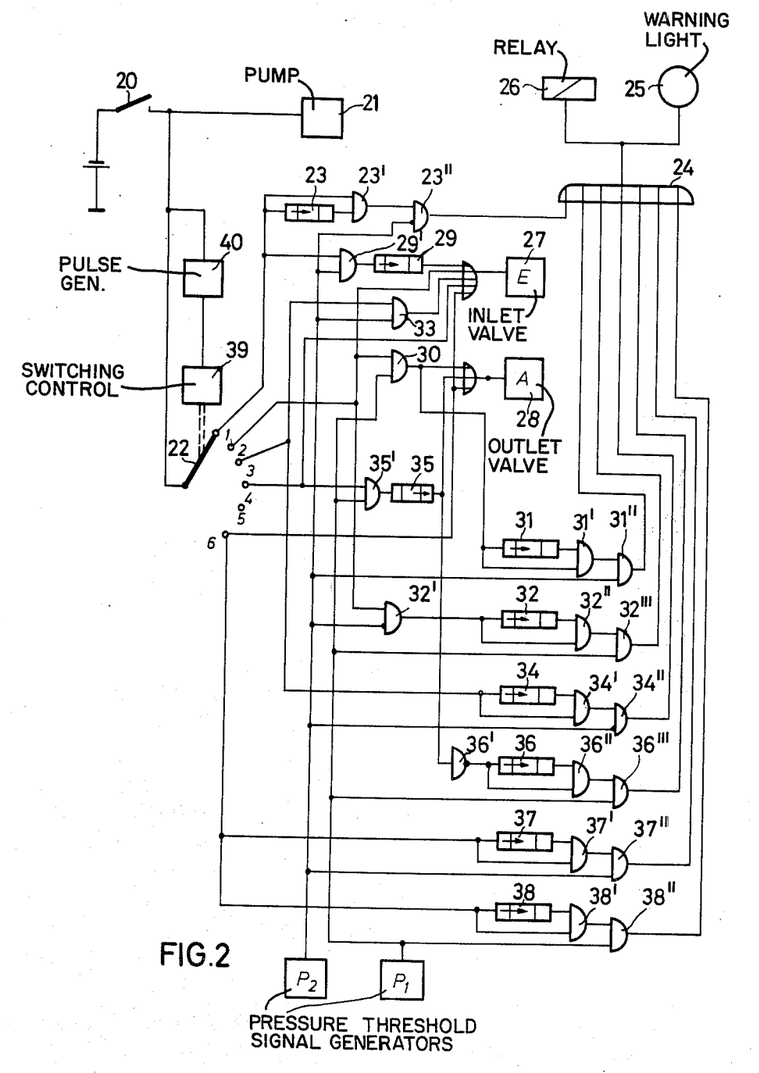
FIG. 2 shows an embodiment of a circuit for the autochecking of the hydraulic circuit of FIG. 1.
Figure 3:
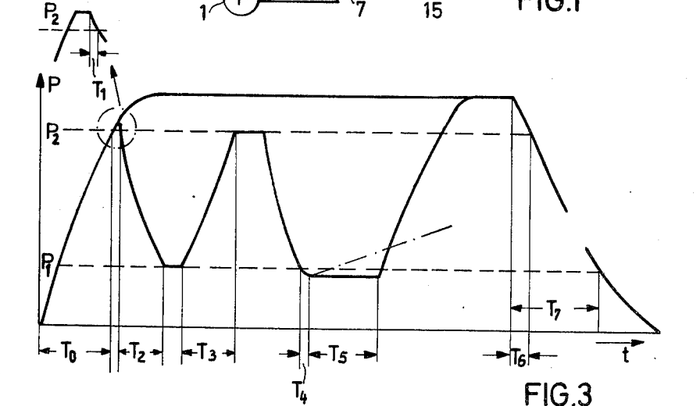
FIG. 3 shows the curve of pressure against time when carrying out a checking method in accordance with the arrangement of FIG. 2.

An embodiment of a checking circuit and a possible checking cycle for this brake apparatus will now be described with reference to FIGS. 2 and 3.

At the beginning of a checking cycle, the pump 21 is actuated by closing a switch 20. A distributor switch 22 is in its first position (shown at (1)). First the pump 21 is to be checked as to whether it builds up a predetermined pressure $P_2$ (which is determined by a threshold of the pressure sensor 16). The two signal generators associated with the pressure sensor are shown as separate boxes $P_1$ and $P_2$ in FIG. 2, which After emit a signal when the appropriate threshold is reached. AFter expiry of a delay time $T_0$ of a time element 23, which time starts with the actuation of the switch 22, an AND gate 23' emits a signal. If, at this point in time, the pressure has not yet reached the threshold $P_2$, a warning signal is produced by means of an AND-gate 23'' and an OR-gate 24, which warning signal causes a warning lamp 25 to light up and further checking is interrupted by means of a relay 26. The warning signal is not produced if the pressure reached the threshold $P_2$ promptly. In this case, the AND-gate 23'' is blocked by a signal from $P_2$ which is fed to a negating input of the AND gate 23'' and the signal from the AND gate 23' is blocked. This starting phase is given the reference $T_0$ in FIG. 3 of the drawing in which the pressure curve P in a controlled channel is plotted against test time $t$. From FIG. 3 it can be seen that the threshold $P_2$ lies somewhat below the saturation pressure of the hydraulic circuit.

In the case of this embodiment, a valve 27 of a brake pressure control valve combination (or a corresponding position of a three-position valve such as 11, 12 and 13) by means of which the brake pressure at the brake is to be kept constant, is not closed directly on reaching the threshold $P_2$. It is delayed for a small period of time by means of a delay element 29 which is actuated by an AND gate 29' when the threshold $P_2$ is reached. The pressure set up is thus a predetermined amount above $P_2$.

Now, if in the next switch position (2) of the pressure switch 22, actuation of a valve 28 (or the corresponding valve position of the three position valve) effecting a brake pressure reduction is effected by an AND 30 until the pressure drops below the threshold $P_1$, then, by means of a delay element 31 which has a small delay time $T_1$ and the AND-gates 31' and 32', it can be determined whether the pressure has dropped below the threshold $P_2$ within the time $T_1$. This time $T_1$ represents a criterion for the correct functioning of the outlet valve 28 at high pressures. A warning signal is produced only if the pressure reduction proceeds more slowly than specified.

Furthermore, it can be checked whether the pressure has dropped below the threshold $P_1$ in a time $T_2$ which starts when the pressure drops below the threshold $P_2$. This is carried out by means of a delay element 32 and gates 32', 32'' and 32''' and in this way it can be determined whether the outlet valve 28 has a predetermined outlet characteristic. As already stated, the pressure is maintained constant when the pressure drops below the threshold $P_1$.

In the next position (3) of the switch 22, at first neither of the valves 27 and 28 is energized so that the pressure increases until it reaches the threshold $P_2$; then the valve 27 is energized by the AND gate 33. At the same time a check is carried out to see whether the valve 27 permits a sufficiently rapid pressure rise. A signal only appears at the OR-gate 24, after a delay of $T_3$ in the delay element 34, by way of gates 34' and 34'' to trigger the alarm if the threshold $P_2$ is not reached before the expiry of the time period $T_3$.

In the position (4) of the switch 22 which follows, the inlet valve 27 is kept closed and the pressure is lowered through gate 35' and time delay element 35. When the pressure falls below the threshold $P_1$, the output signal of the gate 35' ends, but is, however, extended somewhat (period $T_4$) in the time element 35 so that the pressure is maintained a small amount below $P_1$. The end of the control signal initiates a signal to a delay element 36 with a time constant $T_5$ by way of a negator 36' associated therewith. A signal is fed on by means of gates 36'' and 36''', to the OR gate 24 if the pressure exceeds the threshold $P_1$ before the expiry of the time $T_5$. If the pressure does not exceed the threshold $P_1$ in this time, then the valve is tight and no warning signal is needed.

After switching over the switch 22 into position (5), no valve is energized so that pressure is built up to saturation. After a further switch over into the position (6), in which both valves are energized a pressure reduction follows and a warning signal is triggered by a time element 37 ($T_6$) through gates 37' and 37'', if the pressure has not dropped below the threshold in a predetermined time. Thus, $P_2$ is checked. The $P_1$ threshold is likewise checked in switch position (6) by means of a time element 38 ($T_7$) and gates 38' and 38''.

The test method described is then used in the same manner for the other brake channels in which the valves of these channels and their pressure sensors are included.

In the above embodiments, a control apparatus 39, which is controlled by a pulse generator 40 with a preprogrammed timing provides for the automatic switching on of the switch 22; the pulse generator can also be used to provide like time spans for the individual switch positions.

Figure 4:
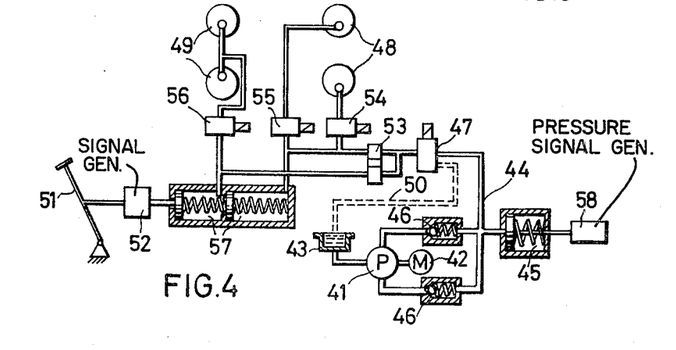
FIG. 4 shows a further embodiment of a brake system with an antilock controller in which only one pressure sensor is provided.

FIG. 4 of the drawing shows another brake system with an antilock controller. Here too, a pump 41 provided with drive 42, sucks fluid from a reservoir 43 and supplies it through non-return valves 46 to a pressure line 44. A small store 45 is connected to this pressure line. The brake pressure control at the brakes is here provided by a valve arrangement 47, which, in its normal position, blocks the pressure line 44 and connects the wheel brakes of wheels 48 and 49 to a feedback line 50 so that a pressureless state prevails at the wheel brakes. In a second position of the valve arrangement 47, it blocks both the line 44 an the return flow and, in a third position, it permits a pressure rise at the wheel brakes. The valve arrangement 47 is controlled by a comparison element (not shown) to which is fed a signal from a signal generator 52, controlled by a brake pedal 51 and a signal from an element for measuring the vehicle deceleration, in such a manner that when a certain degree of pedal actuation takes place, the brake pressure is so adjusted that a corresponding vehicle deceleration occurs. The valve element 53 effectively splits the brake system into two brake circuits. Pressure control valves 54 to 56 are connected into these brake circuits and correspond to valves 11 to 13 of FIG. 1. They are actuated, for pressure control, by an electronic evaluation unit. Further piston-and-cylinder arrangements 57 are associated with both brake circuits and take over the braking function by controlling the brake pressure if the power assistance unit fails.

An apparatus 58 is provided at the store 45, for measuring the deflection of the store and thus the pressure. This apparatus 58 is used for checking the equipment.

Figure 5:
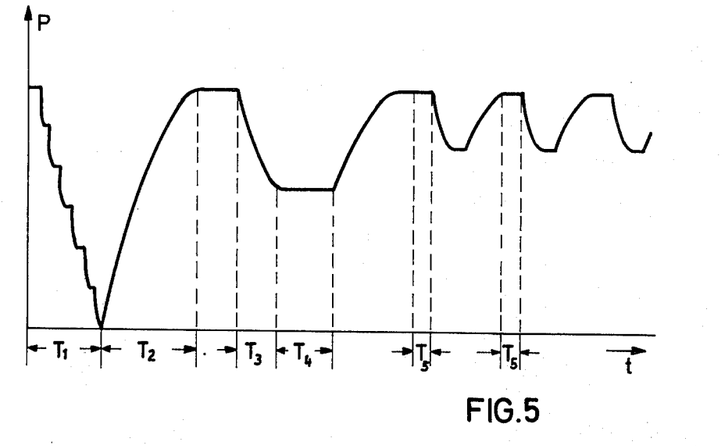
FIG. 5 shows a possible pressure-time curve when using the autochecking method in the case of the arrangement of FIG. 4.

The sequence of a possible checking operation will now be described with reference to FIG. 5. The pump 41 must be periodically switched off because only one pressure monitoring device is provided. In the time $T_1$, with the pump switched off, a pulsed energization of the valves 53 to 56 is carried out. This checks whether the store 45 is effectively emptied in a predetermined time. For this purpose, the apparatus 58 emits a signal when the store 45 reaches a predetermined (empty) position. In the time $T_2$ the pump 41 is in operation and it is checked whether the pump conveys a predetermined volume in this predetermined time. This is again indicated by a signal generator 58 which then also switches the pump 41 off. In the time $T_3$ the pump remains switched off and a check takes place as to whether, within this time, the pressure drops below a predetermined pressure threshold on energization of the valve 47, that is to say, the pressure drop occurs undisturbed. In the time $T_4$ the presure is kept constant (pump remains switched off) and in this time a check takes place as to whether the inlet of the valve 47 or the closed outlets of the valves 47 and 43 to 56 leak. After this the pressure is again built up and, in the time $T_5$, the valve 54 is switched over to provide a pressure reduction. Only after this valve is switched back with the pump switched off can it be determined whether, as a result of switching over of the valve to provide a pressure reduction, an adequate pressure reduction has taken place. This is determined by the pressure passing a predetermined threshold. Subsequently the same check takes place for the other valves. If necessary a test section can be incorporated in which the valves 53 to 56 are pulsed one after the other in order to determine whether they respond rapidly enough.

The signal generator 58 can be an analog generator or a digital generator; it has four or five thresholds in the above embodiment. It can also be so constructed that it emits predetermined signals in different states.

Figure 6:
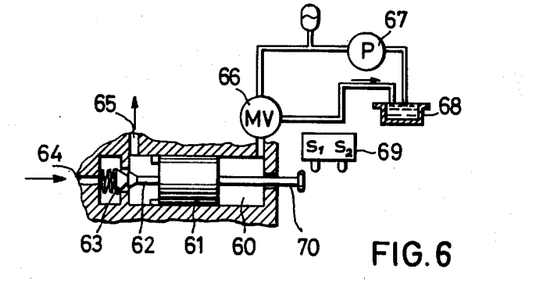
FIG. 6 shows a section of a further brake system with another embodiment of the pressure sensor.

Another brake apparatus with antilock control and another type of pressure measurement is shown in FIG. 6. There, a piston 61 is accommodated in a cylinder 60 and, in the position shown, moves a valve member 63 off its seat by means of the plunger 62. Connection 64 of the cylinder is connected to the brake master cylinder and connection 65 is connection to a wheel brake cylinder. Normal brake operation is possible in the position of the piston 61 shown. If it is determined by sensing apparatus (not shown) that a wheel locking tendency is present, then the pressure on the righthand side of the piston 61 is reduced by means of an electromagnetic valve arrangement 66. Thus the valve member 63 is brought into engagement with its associated valve seat and the pressure at the wheel brake is lowered by further displacement of the piston 61 to the right. If the valve arrangement 66 has a third position, then the pressure at the wheel brake can also be maintained constant when required. A pressure increase at the wheel brake is effected by increasing the pressure to the right hand side of the piston, for which purpose the valve arrangement 66 connects in a pump 67, which sucks pressure fluid from the reservoir 68 and delivers it to this space.

A switch 69, here a two-part switch with individual switches actuated one after the other by a plunger 70, on displacement of the piston 61 to the right, serves for checking of the function of the pump 67, of the valve 66 and also of the sealing of the piston-and-cylinder arrangement 60, 61. The plunger 70 can be used as a plunger which, with the failure of the pump 67 or a leak at the piston 61 in this equipment, pushes the piston to the left into the position shown under the action of a spring force.

It is immaterial to the invention at what frequency individual functions are checked and how the test circuit is constructed in detail (for example, it may well be similar to FIG. 2) In each case it is checked whether predetermined pressure states occur at all, that is to say switch actuations take place or whether they occur in certain predetermined times on specific control orders. The switch 69 could also comprise an arrangement which determines, by means of a magnetic field-sensitive element secured to the arrangement, the spacing of a magnet secured to the plunger 70 and produces predetermined switch signals from this information.

Figure 7:
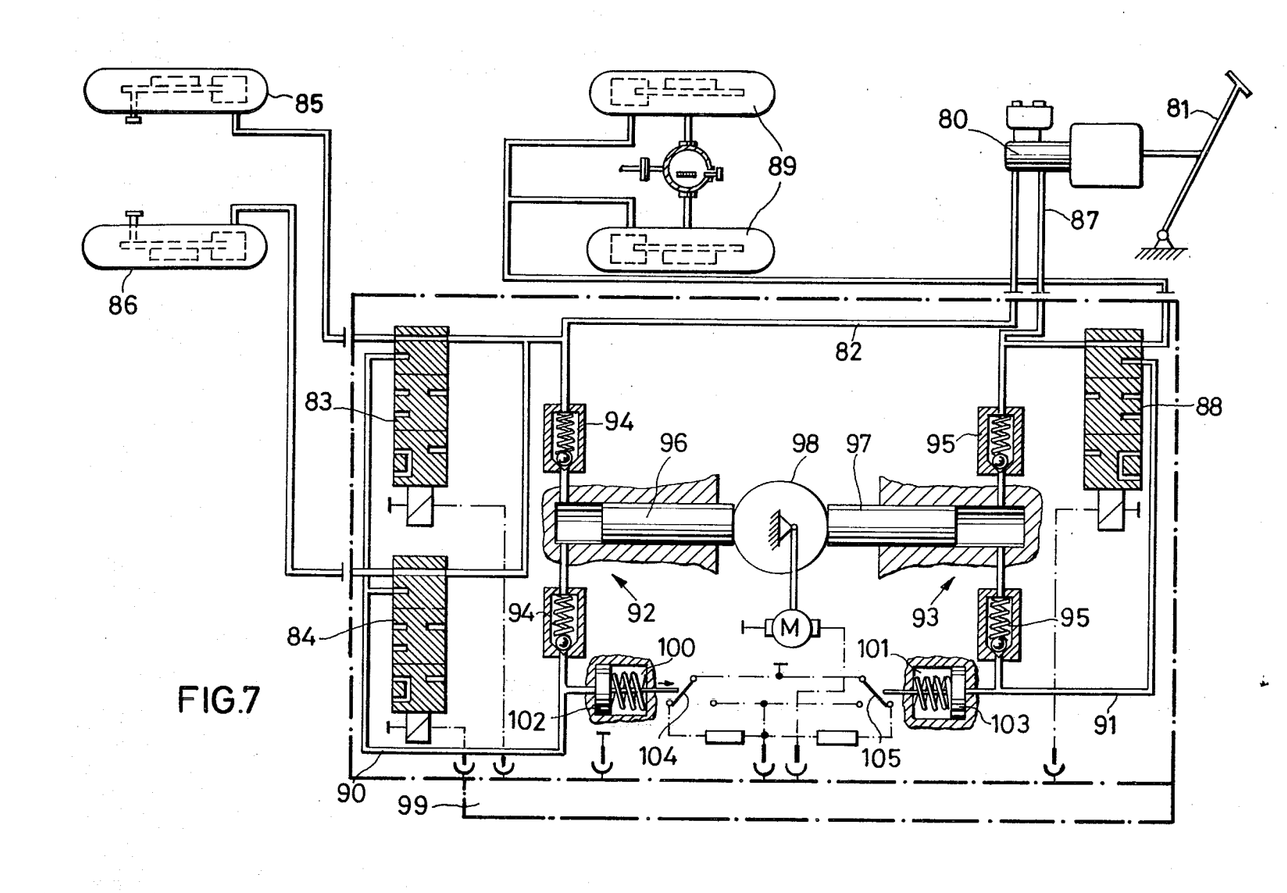
FIG. 7 shows a further embodiment of a brake system with an antilock controller in which, likewise, only one sensor is provided.

Finally it should be noted that the method in accordance with the invention can be used for example even in the case of known antilock controllers in which brake fluid is released from the wheel brake cylinder by means of valves actuated when a tendency to lock is present. Thus passes to a storage chamber and is conveyed back from there into the brake line by means of a pump. If, here, an electrical signal is produced in dependence on the position of the movable element of the storage chamber, for example, similarly to the situation with the storage chamber of FIG. 4, then this signal can serve for checking valves, for example, the outlet valves, and the pump in accordance with the method above described. Thus, for example, if a predetermined brake pressure is present and as a result an outlet valve is actuated for a predetermined time, the movable element of the storage chamber can move into a predetermined position, which is indicated by means of the electrical signal, On the other hand, the emptying of the store must be carried out by the pump in a predetermined time.

by a 7 of the drawing shows an embodiment of a brake system in which the brake master cylinder 80, acted on a brake pedal 81, is used to produce a predetermined brake pressure for checking purposes. For example, a predetermined force is exerted by means of a force generator. A line 82 leads from the brake master cylinder which is of the twin circuit type, to two valve arrangements 83 and 84, from which brake lines go to wheel brakes of wheels 85 and 86. A second line 87 leads to the brakes of rear wheels 89 by means of a valve arrangement 88.

The valve arrangements 83, 84 and 88 are three-position valves which, in their initial position, permit the pressure at the wheel brake to rise, in a second position, keep the pressure at the pressure at the wheel brakes constant and in a third position connect the wheel brake cylinders to return lines 90 or 91. If the valves are brought into this third position, the pressure at the associated wheel brakes is reduced. Control of the valves when a danger of locking is present is effected by a control unit 99 which receives appropriate signals from sensors. Return pumps 92 and 93 are connected into the return lines 90 and 91. These return pumps comprise valves 94 or 95, pumping pistons 96 or 97 and a common eccentric drive 98. They convey the brake fluid let out from the brake cylinder back into the lines 82 and 87.

Small storage chambers 100 and 101 are connected before the pumps. The pistons 102 or 103 of these small storage chambers are biassed by a slight spring pressure so that the pistons are positioned in the position shown when the return pumps 92 and 93 are in operation. With a displacement of the pistons 100 and 101, switches 104 and 105 are actuated by plungers. Thus, on displacement of the pistons, a contact is first opened and later another contact is closed. This displacement of the pistons 100 and 101 takes places with an increase in the flow of brake fluid from the brake cylinders, that is to say with an increase in the volume of the brake fluid which has flowed out or — which is the same — with an increase in the pressure in the outflow line.

Favorably, in the case of the brake system shown, the function of the outlet valve — that is to say the third position of the valves — is tested first. For this, a predetermined pressure must prevail at the brakes. Then the valve is switched over to its third position and a check is carried out as to whether both switch operations — opening of the switch 104 or 105 and closure of the other circuit — occurs in a predetermiend time. If this is the case, the outflow characteristic of the valve is correct. For this test, the appropriate pump 92 or 93 must be shut off. Before the checking of the outlet valve, a further seal check of the valve in its second position can take place. In this it is checked whether the small threshold is exceeded in a predetermined time from switching off the pump, i,e. with the pistons 102 or 103 in the original position.

The function of the pump 92 or 93 can be checked by determining whether, with a filled storage chamber 100 or 101 and the pump started, the two threshold determined by the position of the pistons 102 or 103 are passed within a predetermined time.

The gradients of the inlet valve can be tested here by bringing the valve into its first position for a predetermined time after a pressure reduction at the wheel brake and then opening the outlet valve when the storage chamber is empty. If then, according to the design of the apparatus, the first or both thresholds are exceeded, then this indicates that the pressure build up through the valve occurs sufficiently rapidly since only in the case of sufficiently high pressure at the wheel brake cylinder can an adequate deflection of the piston of the storage chamber occur.

The electronic unit for carrying out the checking can be partially or completely integrated in a block 99. In the first case, the block 99 can be connected to the checking apparatus, which contains the pulse generator and actuates and checks the individual hydraulic parts sequentially. If apparatus is not in order, the warning lamp 106 lights up.

It will be understood that the above description of the present invention is susceptible to various modifications changes and adaptations.

What is claimed is:

1. An autochecking arrangement for a hydraulic system including an actuating piston, a pressure source for supplying pressure for displacing said actuating piston a valve means connected in the pressure line between the pressure source and said actuating piston for causing displacement of said actuating piston, when said valve means is actuated, and pump means connected in said hydraulic system, said autochecking arrangement comprising: pressure means connected into said hydraulic system and emitting signal corresponding to at least two different sensed pressure thresholds; switch means for controlling said valve means and said pump means to sequentially provide different actuation states of said hydraulic system and different pressures therein; monitoring means responsive to said signals from said pressure sensing means corresponding to said two different pressure thresholds, for determining if, in the individual actuation states caused by said switch means, said pressure thresholds are reached within given time periods; and, warning means responsive to an output from said monitoring means for producing an indication when said given time periods are exceeded.

2. An arrangement as defined in claim 1, and comprising generator means for controlling said switch means in accordance with a predetermined timing.

3. An arrangement as defined in claim 1, wherein said pressure sensing means comprises a pressure switch with at least two stages.

4. An arrangement as defined in claim 1, wherein said pressure sensing means comprises means for producing an analog signal proportional to the sensed pressure and a comparison element fed with said analog signal and at least two comparison signals and producing switch signals from these signals.

5. An arrangement as defined in claim 1, wherein said pressure sensing means comprises means for producing a digital signal proportional to the sensed pressure and a comparison element fed with said digital signal and at least two comparison signals and producing switch signals from these signals.

6. An arrangement as defined in claim 1, wherein said pressure sensing means comprises means for measuring deflection of a movable part of a storage chamber.

7. An arrangement as defined in claim 1, wherein said pressure sensing means comprises means responsive to movement of said actuating piston.

8. An arrangement as defined in claim 7, and comprising a displaceable plunger connected to said actuating piston and switch means actuable by said plunger.

9. An arrangement as defined in claim 7, and comprising a displaceable plunger connected to said actuating piston and switch means actuable on approach of said plunger to said switch means.

10. A braking system for a vehicle having a wheel with a brake cylinder, comprising a brake actuating piston in said cylinder, a pump for supplying pressure fluid for actuation of said actuating piston, a valve arrangement for controlling the pressure of pressure fluid at the wheel brake cylinder, a pressure sensor for sensing said pressure of said pressure fluid at said wheel brake cylinder and emitting signals corresponding to at least two sensed pressure thresholds, switch means for controlling said braking system to provide sequentially different actuation states of said braking system, pulse generator means for controlling said switch means in accordance with a predetermined timing, and monitoring means for monitoring said different actuation states of said braking system in cooperation with said pressure sensor and for producing an indication when the actuation state monitored is different from a desired actuation state.

11. A braking system as defined in claim 10, and comprising further brake control valves for antilock control of the brakes of said vehicle connected between said valve arrangement and said wheel brake cylinder.

12. A braking system for a vehicle having a wheel with a brake comprising a wheel brake cylinder, a brake actuating piston in said cylinder, a pump for supplying pressure fluid for actuation of said actuating piston, a valve arrangement for controlling the pressure of pressure fluid at said wheel brake cylinder, means for rendering said pump inoperative from time to time, a pressure sensor connected between said pump and said valve arrangement for sensing the pressure of said pressure fluid at this point of said braking system and emitting signals corresponding to at least two sensed pressure thresholds, switch means for controlling said braking system to provide sequentially different actuation states of said braking system, pulse generator means for controlling said switch means in accordance with a predetermined timing, and monitoring means for monitoring said different actuation states of said braking system in cooperation with said pressure sensor and for producing an indication when the actuation state monitored is different from a desired actuation state.

13. A braking system as defined in claim 12, and comprising further brake control valves for antilock control of said brakes of said vehicle and connected between said valve arrangement and said wheel brake cylinder.

14. A braking system for a vehicle having a wheel with a brake comprising a wheel brake cylinder, a brake actuating piston in said cylinder, a pressure source for the supplying pressure fluid for actuation of said brake actuating piston, a brake pressure control valve connected in a pressure line to said wheel brake cylinder, a plunger for maintaining said valve open, a plunger actuating piston connected to said plunger, a control valve controlling displacement of said plunger actuating piston, an antilock controller for controlling said control valve, a pressure sensor for sensing pressure in said pressure line and emitting signals corresponding to at least two sensed pressure thresholds, switch means for controlling said braking system to provide sequentially different actuation states of said braking system, generator means for controlling said switch means in accordance with a predetermined timing, and monitoring means for monitoring said different actuation states of said braking system in cooperation with said pressure sensor and for producing an indication when the actuation state mentioned is different from a desired actuation state.

15. A braking system as defined in claim 14, wherein said pressure sensor comprises means for sensing the position of said plunger actuating piston.

16. A braking system for a vehicle having a wheel with a brake comprising a wheel brake cylinder, a brake actuating piston in said cylinder, a pressure source for supplying pressure fluid for actuation of said brake actuation piston, an electromagnetic valve arrangement connected into a brake line leading to said wheel brake cylinder for blocking said brake line and connecting said brake line between said electromagnetic valve arrangement and said wheel brake cylinder to a return line, a pump connected in said return line for pumping pressure fluid from said return line to said brake line prior to said electromagnetic valve arrangement, an antilock controller for controlling said electromagnetic valve, a pressure sensor in said return line, and emitting signals corresponding to at least two different sensed pressure thresholds, switch means for controlling said braking system to provide sequentially different actuation states of said braking system, generator means for controlling said switch means in accordance with a predetermined timing, and monitoring means for monitoring said different actuation states of said braking system in cooperation with the signals from said pressure sensor and for producing an indication when, in the actuation state being monitored, said pressure thresholds are not reached within predetermined time periods.

17. A braking system as defined in claim 16, and comprising a storage chamber for fluid in said return line acting as said pressure sensor.

* * * * *